United States Patent Office 3,548,192
Patented Dec. 15, 1970

3,548,192
INFRARED SCANNER USING A DOUBLE SIDED INCLINED MIRROR MOUNTED ON ANNULAR AIR BEARINGS
Victor Michael Farmer, Crowthorne, and John Francis Knight, Teddington, England, assignors to Electric & Musical Industries Limited, Hayes, England, a British company
Filed Apr. 11, 1968, Ser. No. 720,726
Int. Cl. G01t 1/16
U.S. Cl. 250—83.3                                    11 Claims

ABSTRACT OF THE DISCLOSURE

This specification describes a radiant energy scanner intended for use in a line-scan aerial reconnaissance system in which a double sided mirror is mounted on two large annular air bearigs so as to be inclined to the axis of rotation of the bearings. Radiation, such as infrared radiation, derived from the terrain is reflected by the mirror through the centre of one or other of the annular portions of the bearings on to suitable sensing means. The mirror may be rotated by means of an air turbine which may be driven by the same air supply as feeds the bearings. The rotating mirror may be plane or concave, and if the mirror is plane means should be provided for focusing the radiation received by the rotating mirror on the sensing means. The sensing means may be placed away from the axis of rotation of the roating mirror or may be on that axis either between the rotating mirror and the focusing means which may be in the form of concave mirrors or behind the rotating mirror which may be provided with a central aperture to allow radiation to pass through the mirror to the sensing means.

---

This invention relates to a scanning device for electromagnetic waves and especially though not excusively to a scanning device for infra-red wavelengths.

Devices for scanning electromagnetic waves, such for example as optical, ultra violet or infra-red radiation, are required for a variety of purposes. One example of the need for an infra-red scanner is for aerial reconaissance puposes in which the infra-red emission, from a terrain over which an aircraft is flying, is scanned in strips or lines lying normal to the flight path of the aircraft. The forms of scanners that have been proposed hitherto have been bulky and have necessitated a rather large pod structure, which is undesirable from the aerodynamic point of view.

It is an object of the invention to provide an improved form of scanner which is more compact than those proposed hitherto.

According to the invention there is provided a radiant energy scanner including:

(a) A rotatable assembly comprising a pair of air bearings and a mirror mounted on said bearings so as to extend between said bearings and inclined to the axis of rotation of said assembly, (b) Means for rotating said assembly, (c) First aperture means, between said bearings, for permitting radiant energy arriving from the side of said axis to be incident on said mirror, (d) Second aperture means, formed as an unobscured region in the centre of at least one of said bearings, for permitting said radiant energy, after reflection from said mirror to emerge from said assembly in a direction substantially parallel with the axis of rotation of said assembly, and (e) Means, fixed with respect to said axis for rotation, for receiving said energy after emergence of said energy from said second aperture means, said fixed means including sensing means for sensing the presence of radiant energy.

According to additional features of the invention the means for rotating the assembly comprises an air turbine. Focusing mirrors are provided to focus the radiant energy onto the sensing means. The mirror included in the rotatable assembly is in the form of a double-sided plane mirror, the system being such that radiation scanned during successive revolutions of said assembly is passed alternately through one and then the other of the annular bearings.

Figure 1:
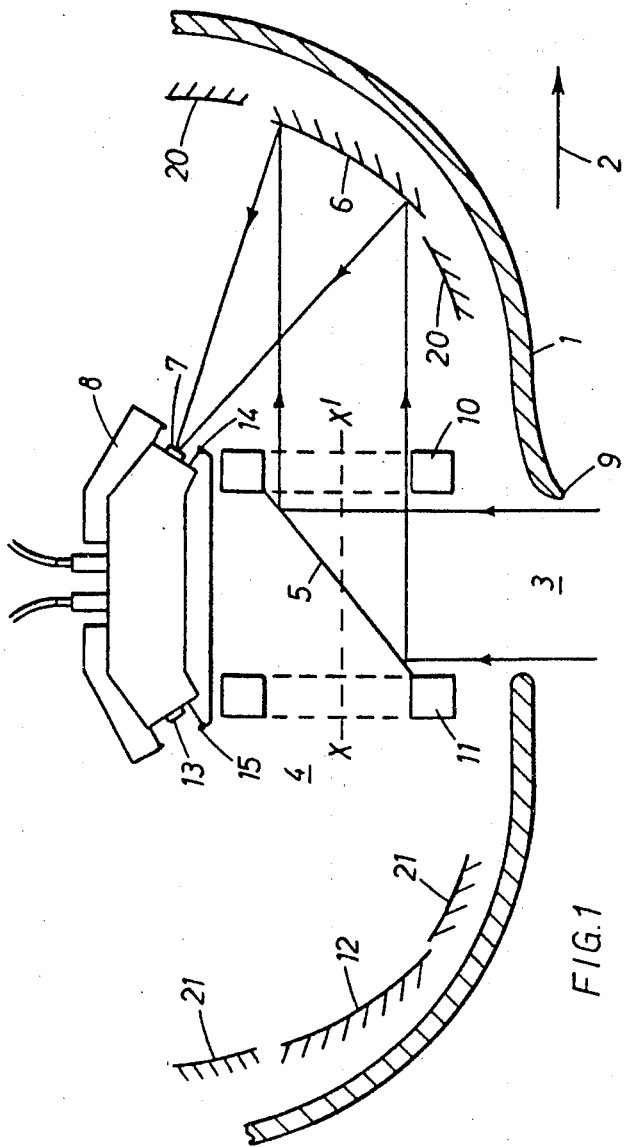
Figure 2:
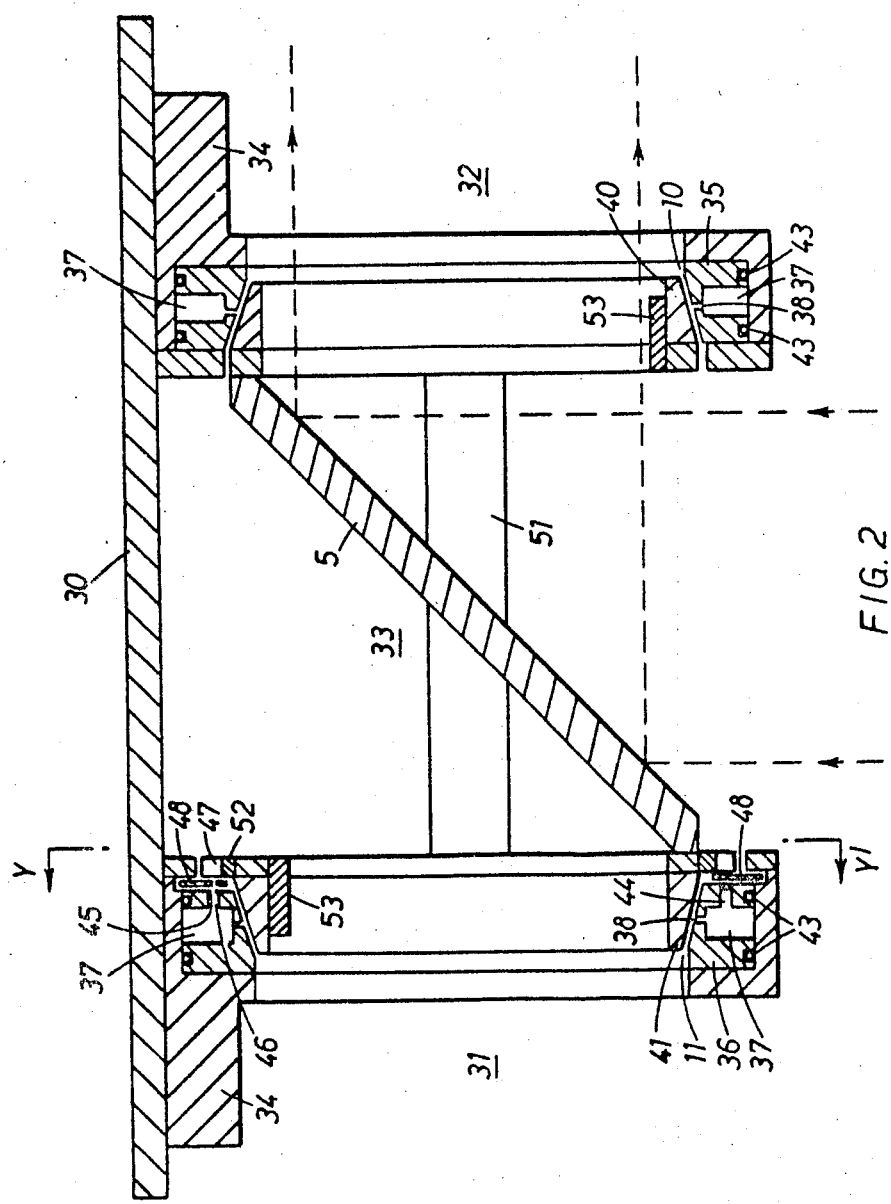
Figure 3:
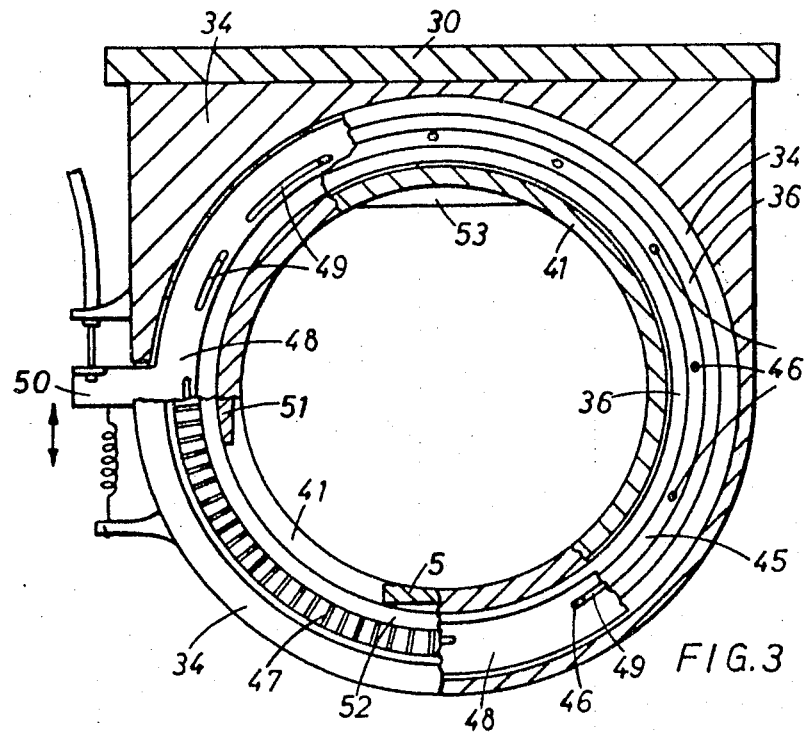
Figure 4:
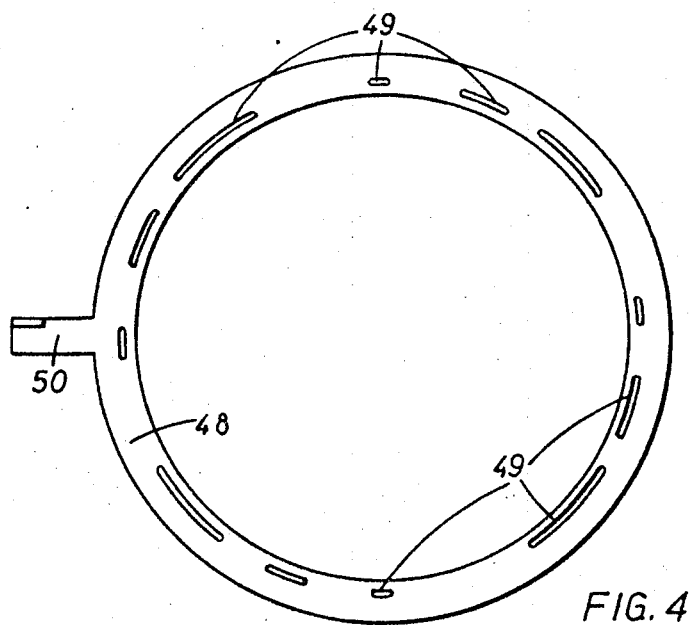
Figure 5:
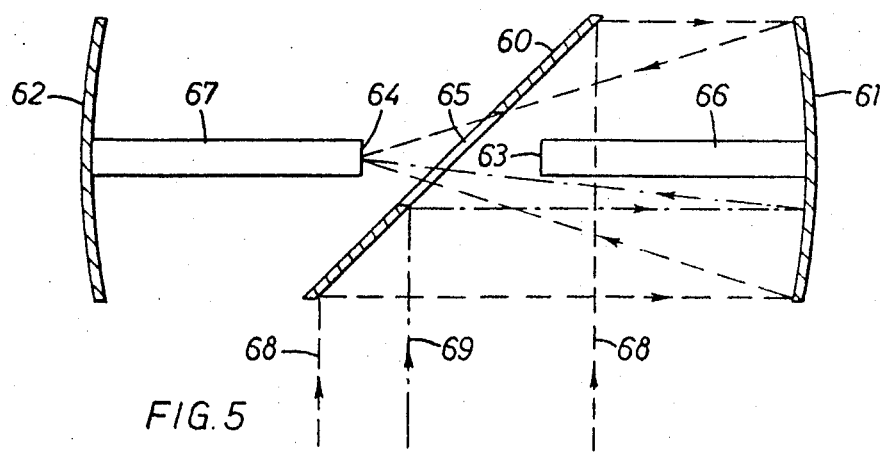
Figure 6:
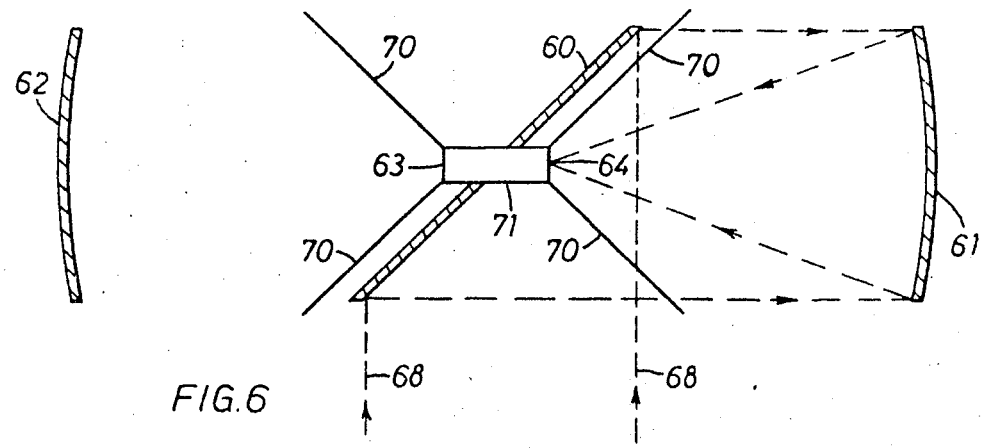

In order that the present invention may be clearly understood and readily carried into effect an embodiment of the same will now be described, by way of example only, with reference to the accompanying drawings of which:

FIG. 1 shows a schematic vertical section of a scanning system constructed according to the invention, FIG. 2 is a longitudinal section of the rotating mirror assembly constructed in accordance with the invention, FIG. 3 illustrates a part of the assembly of FIG. 2 as seen from the direction Y–Y' in FIG. 2 and includes a plurality of sectional views, FIG. 4 shows the configuration of the speed control shutter employed in the drive turbines, FIG. 5 is a diagram of another example of a scanning system according to the invention, and FIG. 6 is a diagram of a further example of a scanning system according to the invention.

Referring now to FIG. 1, this shows in schematic form a vertical longitudinal section through a pod 1 containing a scanner constructed in accordance with the present invention. The pod is mounted on the underside of an aircraft which is capable of flying in the direction of the arrow 2. A slot 3 is cut in the pod through which electromagnetic radiation can pass to the scanner 4. The front edge 9 of the slot 3 is shaped so that the slipsteam is deflected from the slot 3.

Radiant energy, in this instance infra-red radiation, enters the pod via the slot 3 and is reflected by a plane mirror 5 onto a concave mirror 6 which focuses the energy onto the sensitive region of an infra-red detector 7. The detector is cooled by refrigerating the housing 8 by any suitable method such as, for example, a closed cycle or an open cycle expansion cooling system.

The plane mirror 5 is made substantially elliptical in shape and is mounted between two air bearings 10 and 11, at an angle of 45 degrees to the rotation axis of the assembly indicated by the dashed line XX'. The mirror is formed with a reflecting surface on both sides and the bearings 10 and 11 are annular in form. Radiation approaching from the side of the rotation axis XX' in a direction substantially normal to that axis, is reflected by the mirror 5 along the axis XX', through the unobstructed region in the centre of the bearing 10, and onto the off-axis portion of a paraboloidal mirror 6, by which means the radiation is concentrated on the detector 7, placed at the focus of the mirror 6.

The assembly including the mirror 5 is rotated about the axis XX' by means of an airturbine. As the mirror rotates, energy arriving from a strip of terrain lying normal to the flight path of the aircraft, is projected in sequence onto the detector 7 and the electrical signal generated by the detector 7 is fed to utilisation apparatus in the aircraft for effecting processing, display, transmission or recording.

By employing a double-sided mirror 5 the assembly is enabled to scan the terrain twice per revolution of the mirror 5, and a similar off-axis paraboloidal mirror 12 focuses the radiation onto a second detector 13 during the second half of the rotation period of the mirror 5. Gating circuit means, not shown, are provided so that signals from the detector 13 are fed to the utilisation apparatus while terrain radiation is directed onto the detector 13, the signals from detector 7 being suppressed so that spurious signals from the scanner housing do not produce interference. Similarly during the next half revolution of the mirror 5, when the detector 7 is feeding terrain signals out to the utilisation apparatus, the output from detector 13 is suppressed.

The instantaneous resolution of the scanner is determined by the ratio of the size of the detector elements 7, 13 to the focal length of the focusing mirrors 6, 12. Moreover it is desirable to restrict the field of view of the detector system as nearly as possible to the aperture of the focusing mirror. This is achieved in part, by means of cooled apertures 14, 15 which are arranged in contact with the detector cooler. Any remaining field of view lying outside the aperture of the focusing mirrors 6, 12 can be made to appear at a low temperature by surrounding the focusing mirrors 6, 12 with spherical mirrors 20, 21 the centres of curvature of which are located at the detectors 7, 13. The detectors 7, 13 then see their own cold surfaces and cold surroundings by reflection.

The scanning mirror assembly is shown in vertical cross-section in FIG. 2, to which reference will now be made together with FIG. 3 which shows views of the bearing assembly from the direction YY' indicated on FIG. 2 and includes a plurality of sectional views. The scanner comprises two stator assemblies 31, 32 rigidly mounted on a base plate 30 with the rotor assembly 33 between them. The stator assemblies 31, 32 comprise mounting brackets 34 and the outer parts 35, 36 of the conical air bearings 10, 11. The bearing parts 35, 36 contain the air inlet manifolds 37 and the bearing inlet orifices 38, which are spaced in even manner around the bearing surface and allow a controlled amount of air to pass from the manifolds 37 into the bearing clearance between the conical surface of bearing stators 35, 36 and the corresponding conical surface of the rotor bearing portions 40, 41. Air is prevented from escaping round the edges of the manifold 37 by means of "O" ring seals 43.

The outer bearing part 36 at one end of the scanning mirror assembly is provided with a further annular manifold 44 and this allows air under pressure to pass to the air turbine nozzle ring 45. The turbine nozzle ring 45 is provided with a plurality of evenly spaced holes 46 formed therein at an angle such that air issuing therefrom is suitably directed on a set of turbine blades 47, mounted on the rotor assembly 33, to cause the assembly to rotate. A turbine control ring 48 is located over the turbine nozzle ring 45, and has a plurality of slots 49 cut therein of varying length so that by rotating the ring 48 with respect to the stationary portion 36, the number of nozzles 46 which are uncovered at any instant, may be varied from zero to the full amount. FIG. 4 illustrates the form taken by the turbine control ring 48 and it will be observed that the turbine nozzles 46 are uncovered in diametrically opposite pairs in symmetrical fashion to avoid out of balance forces as far as possible. The ring 48 may be controlled via a projection 50 in any convenient manner in order to control the speed of rotation of the assembly 33.

The rotor assembly 33 comprises the two conical bearing portions 40, 41 held together by two axially parallel straps 51 and the mirror 5 which is set at an angle of 45 degrees to the axis of rotation of the assembly 33. The turbine blade ring 52, which supports the turbine blades 47, is mounted on the bearing portion 41 at one end of the assembly 33 so that it is capable of rotating in a path correctly located with respect to the jets of air, issuing from the nozzles 46 in the turbine ring 45, to be driven round thereby. The rotor assembly is dynamically balanced by means of weights 53 mounted on the bearing portions 40, 41.

The operation of the unit is as follows. Air under pressure is fed into the manifolds 37 by any convenient supply means (not shown). Air under pressure inside the manifolds 37 passes through the orifices 38, and causes a build up of pressure in the small clearance between the conical bearing surfaces 41, 36 and 40, 35. If any deflection of the rotor occurs under the effect of a force acting thereon, then the bearing clearance in the direction from which the force is acting will tend to increase, and the air from the manifold 37, whose flow is restricted by the small size of the orifices 38, will flow out from the bearing clearance more readily, reducing the effective pressure of the air situated between the two bearing surfaces at that point. However the bearing clearance in the region diametrically opposite to this will tend to be reduced restricting the flow of air, and increasing the effective pressure of the air located between the two bearing surfaces. Consequently there results a net restoring force due to the difference in air pressure in the two bearing regions which tends to oppose the initial force causing the displacement. By employing conical bearing surfaces, the restoring forces may be exerted in directions both normal to the axis of rotation and along the axis thus serving to maintain the rotor assembly 33 central between the static members 31 and 32.

The mirror assembly 33 is rotated by means of the impulse turbine 47, 52 mounted on one bearing ring 41. The turbine control ring 48 is located between the nozzle assembly 45, 46 and the turbine blades 47 in such a way that by rotating the control ring 48, the nozzles 46 are progressively exposed by the slots 49 in diametrically opposed pairs, thus producing a balanced thrust on the turbine wheel 47, 52. In this way the whole of the bearing and drive mechanism is mounted on an annular assembly allowing an uninterrupted axial light path from the 45 degree mounted double-sided rotating mirror. Although as described above the turbine is driven by compressed air from the same manifold as the air bearings, a separate manifold and indeed a separate source of compressed air may be provided for the turbine, which may be of more than one stage.

FIGS. 5 and 6 show in diagrammatic form two other optical arrangements which may be employed so as to produce arrangements which occupy less vertical height than the arrangement shown in FIG. 1 so that a smaller pod may be used to accommodate the apparatus. To simplify the drawings the air bearings and air drive turbine are not shown in FIGS. 5 and 6 but the plane mirror at the centre of the system is carried by bearings and rotated about an axis similar to those shown in FIG. 1.

Referring now to FIG. 5 a rotating double-sided plane mirror 60 is inclined at an angle of 45 degrees to the axis of rotation as in the arrangement described with respect to FIG. 1 and the incident radiation is reflected by the mirror 60 alternately to concave paraboloidal or spherical mirrors 61 and 62 disposed on opposite sides of the mirror 60 along its axis of rotation. The mirrors 61 and 62 focus the radiation on to detectors 64 and 63 respectively through a hole 65 in the centre of the mirror 60. The detectors 63 and 64 are mounted on supports 66 and 67 extending from the mirrors 61 and 62 in the manner shown in the figure. The lengths of the supports 66 and 67 are chosen so that the hole 65 in the centre of the mirror 60 is kept sufficiently small to avoid undue loss of efficiency due to radiation in the area of the mirror 60. The dashed lines 68 represent the outer boundaries of the beam of radiation which is focused onto the detector 64 from which it will be evident that the boundary of the hole 65 in the centre of the mirror 60 must be chosen so that radiation reflected by the upper part of the periphery of the mirror 61 onto the detector 64 is not obstructed by the mirror 60. The chain dotted line 69 corresponds to the inner periphery of the beam of radiation which is reflected by the part of the mirror 60 adjacent to the hole 65 from which it is reflected to the mirror 61 and from that mirror to the detector 64; from an examination of the chain dotted line 69 it will be seen that the lengths of the supports 66 and 67 should be chosen so that they do not obstruct radiation which may be reflected from the mirrors 61 and 62 to the detectors 64 and 63 respectively.

In a modification of the arrangement shown in FIG. 5 the detectors 63 and 64 are mounted slightly below the axis of rotation of the mirror 60, the mirrors 61 and 62 being tilted slightly to focus the radiation onto the detectors 63 and 64 enabling the size of the hole 65 to be slightly reduced and therefore the efficiency of the system to be increased.

In the system shown in FIG. 6 the detectors 63 and 64 are mounted on a support 71 which passes through the centre of the mirror 60, and the support 71 being mounted by two spiders represented by the lines 70 which are attached to the stationary outer parts of the air bearings on which the mirror 60 is mounted. It will be evident that apart from the obstruction offered by the two spiders supporting the detectors 63 and 64 the efficiency of the system shown in FIG. 6 is higher than that of the system shown in FIG. 5 because the central part of the mirror 60 which cannot be used to reflect radiation is much smaller in the case of FIG. 6. However, the arrangement of FIG. 6 does have the disadvantages of slightly increased length of the arrangement of FIG. 5 for the same focal length of mirrors 61 and 62.

In a modification of the system shown in FIG. 6, the detectors 63 and 64 may be on separate supports mounted by respective spiders, so as to lie on the axis of rotation of the mirror 60 but out of the path of radiation impinging on the mirror 60; with this modification no hole need be provided in the mirror 60 and each of the detectors 63 and 64 mounted on its respective spider may be formed as a preset unit with the corresponding mirror 62 or 61, the units then being joined to the rotating mirror assembly.

In all of the embodiments so far considered the rotating mirror arrangement has included a double-sided plane mirror, however, the rotating mirror may be concave formed as a part of either a paraboloidal or spherical mirror on each side so that the radiation may be focused directly from the rotating mirror onto two detectors lying on the axis of rotation of the mirror. Moreover, the radiation reflected from such a rotating double concave mirror arrangement may be focused onto plane mirrors or further concave mirrors to produce an arrangement such as is shown in FIG. 6, for example, but which is more compact than that shown in FIG. 6.

In one practical embodiment of the present invention, a mirror assembly was produced which was capable of rotating at a speed of 10,000 r.p.m. while providing an axial radiation path in both directions of about 4 inches in diameter. In order to provide a mirror of sufficient rigidity it is mounted on rigid material of honeycomb structure, the overall thickness of the double-sided mirror being three-quarters of an inch.

In the embodiments of the invention described above the detectors would be cooled by a closed cycle refrigeration engine when operating temperatures below 30° Kelvin are required, whereas for operating temperatures around 77° Kelvin either a closed cycle refrigerator or an open cycle Joule-Thomson cooler may be employed. The detectors 7 and 13 or 63 and 64 may be either single elements or arrays of elements depending on the resolution required and on the range of airspeed and altitude to be accommodated. If different resolutions are required to be available from one scanner assembly, it is convenient to use a plurality of pairs of detectors mounted on an accurately positioned selector system.

The present invention allows the full aperture of the system to be employed throughout the whole of the scanning sweep. By arranging the rotation axis near the bottom of the optical arrangement only a small width of aperture in the fuselage or pod is required to accommodate large scanning angles, and the assembly is capable of being fitted into a relatively small diameter pod.

What we claim is:

1. An infra-red radiation scanner including two elements for sensing the presence of infra-red radiation, a rotatable assembly including a pair of annular air bearings and a double-sided plane mirror mounted between said air bearings, said mirror being inclined to the axis of rotation of said bearngs at an angle substantally equal to 45 degrees so that radiation arriving from directions perpendicular to said rotation axis is reflected by said mirror through the annular portions of said bearings, an air turbine for rotating said assembly, two concave mirrors placed on said axis of rotation to receive radiation reflected by said mirror through said annular portions and focus said radiation onto respective ones of said sensing elements, said sensing elements being mounted from stator portions of said bearings by means at least partially transparent to infra-red radiation so as to lie on said axis of rotation one each side of said rotating mirror.

2. A radiant energy scanner including:
   (a) a rotatable assembly comprising a pair of air bearings and a mirror mounted on said bearings so as to extend between said bearings and inclined to the axis of rotation of said assembly,
   (b) means for rotating said assembly,
   (c) first aperture means, between said bearings, for permitting radiant energy arriving from the side of said axis to be incident on said mirror,
   (d) second aperture means, formed as an unobscured region in the centre of at least one of said bearings, for permitting said radiant energy, after reflection from said mirror, to emerge from said assembly in a direction substantially parallel with the axis of rotation of said assembly, and
   (e) means, fixed with respect to said axis of rotation, for receiving said energy after emergence of said energy from said second aperture means, said fixed means including sensing means for sensing the presence of radiant energy.

3. A radiant energy scanner according to claim 2 wherein said means for rotating said assembly comprises an air turbine driven by an air supply which also supplies air to said bearings.

4. A radiant energy scanner according to claim 2, wherein said mirror has two reflective faces, said second aperture means is formed as an unobscured region in the centre of each of said bearings, and said fixed means includes respective means for receiving energy reflected from either face of said mirror and means for sensing the presence of radiant energy.

5. A radiant energy scanner according to claim 4 wherein said means for rotating said assembly comprises an air turbine driven by an air supply which also supplies air to said bearings.

6. A radiant energy scanner including:
   (a) a rotatable assembly including a pair of bearings and a mirror, having two reflective faces, mounted on said bearings so as to extend between said bearings and inclined to the axis of rotation of said assembly,
   (b) means for rotating said assembly,
   (c) first aperture means, between said bearings, for permitting radiant energy arriving from the side of said axis to be incident alternately on the two faces of said mirror,
   (d) second aperture means, formed as an unobscured region in the centre of each of said bearings, for permitting the radiant energy reflected from one face of said mirror to emerge from said assembly through the unobscured region in one of said bearings in a first direction substantially parallel to the axis of rotation of said assembly, and the energy reflected from the other face of said mirror to emerge from the assembly through the unobscured region in the other of said bearings in a second direction, substantially parallel to said axis of rotation and substantially opposite in sense to said first direction, (e) first means, fixed with respect to said axis of rotation, for receiving radiant energy emergent from said assembly in said first direction, (f) second means, fixed with respect to said axis of rotation for receiving radiant energy emergent from said assembly in said second direction and, (g) said first and second fixed means each including sensing means for sensing the presence of radiant energy.

7. A radiant energy scanner including a rotatable assembly comprising a pair of annular air bearings each having a central aperture and a plan mirror, having two reflective faces, mounted on said bearings so as to extend between said bearings and inclined at an angle substantially equal to 45 degrees to the axis of rotation of said assembly so that radiation arriving from a direction perpendicular to said axis of rotation is reflected alternately by the two faces of said mirror respectively through the apertures of said bearings, respective focusing means for receiving light reflected through the annular regions, each focusing means comprising a concave mirror for the respective face of said plane mirror, and sensing means comprising a sensing element at the focus of each of said mirrors, said sensing means being sensitive to the presence of radiant energy.

8. A scanner according to claim 7 wherein said sensing means is supported substantially on the axis of rotation of said rotating mirror, said sensing means comprising two sensing elements, each responding to radiation reflected from a respective side of said rotating mirror 9. A scanner according to claim 8 wherein said sensing means is supported by two supporting means respectively attached to stator parts of said annular bearings.

10. A scanner according to claim 8 wherein said rotating mirror is provided with a central aperture through which radiant energy is reflected by said concave mirrors onto said sensing elements.

11. A scanner according to claim 9 arranged to respond to infra-red radiation.

References Cited

UNITED STATES PATENTS

| 2,960,649 | 11/1960 | Bloch | 324—0.5 |
| 3,210,848 | 10/1965 | Bizzigotti | 308—A(UX) |
| 3,220,010 | 11/1965 | Hand, Jr. | 250—83.3IR |
| 3,230,376 | 1/1966 | Goetze, et al. | 250—83.3IR |
| 3,239,674 | 3/1966 | Aroyan | 250—83.3IR |

ARCHIE R. BORCHELT, Primary Examiner

U.S. Cl. X.R.

250—236; 308—1

UNITED STATES PATENT OFFICE
CERTIFICATE OF CORRECTION

Patent No. 3,548,192      Dated December 15, 1970

Inventor(s) Victor Michael Farmer & John Francis Knight

It is certified that error appears in the above-identified patent and that said Letters Patent are hereby corrected as shown below:

Column 1, after line 9, insert -- Claims priority, applicatic Great Britain, April 12, 1967, 16884/67 --.

Signed and sealed this 10th day of August 1971.

(SEAL)
Attest:

EDWARD M. FLETCHER, JR.
Attesting Officer

WILLIAM E. SCHUYLER, JR.
Commissioner of Patents